(12) United States Patent
Santoni (10) Patent No.: US 12,202,176 B2
(45) Date of Patent: Jan. 21, 2025

(54) MOULDING ARRANGEMENT

(71) Applicant: McLaren Automotive Limited, Woking (GB)

(72) Inventor: Claudio Santoni, Woking (GB)

(73) Assignee: McLaren Automotive Limited, Woking (GB)

( * ) Notice: Subject to any disclaimer, the term of this patent is extended or adjusted under 35 U.S.C. 154(b) by 928 days.

(21) Appl. No.: 16/757,640

(22) PCT Filed: Oct. 22, 2018

(86) PCT No.: PCT/GB2018/053049
§ 371 (c)(1),
(2) Date: Apr. 20, 2020

(87) PCT Pub. No.: WO2019/081904
PCT Pub. Date: May 2, 2019

(65) Prior Publication Data
US 2020/0331215 A1    Oct. 22, 2020

(30) Foreign Application Priority Data

Oct. 23, 2017   (GB) ...................................... 1717411

(51) Int. Cl.
   *B29C 43/04*    (2006.01)
   *B29C 45/04*    (2006.01)
   (Continued)

(52) U.S. Cl.
   CPC .............. *B29C 43/04* (2013.01); *B29C 45/04* (2013.01); *B29C 70/48* (2013.01); *B29C 70/54* (2013.01);
   (Continued)

(58) Field of Classification Search
   CPC . B29C 2043/046; B29C 70/461; B29C 45/04; B29C 2043/148; B29C 70/48; B29C 70/467; B29C 33/38
   See application file for complete search history.

(56) References Cited

U.S. PATENT DOCUMENTS 3,809,739 A * 5/1974 Gelin .................... B29C 33/202
                                                                425/389
8,545,662 B2 * 10/2013 Jagos ..................... B29C 33/44
                                                                156/536
(Continued)

FOREIGN PATENT DOCUMENTS

CN   102355990   2/2012
CN   107225773   10/2017
(Continued)

OTHER PUBLICATIONS

CN Application No. CN201880068871.3, First Chinese Office Action, with English Translation, Mailed On Sep. 24, 2021, 19 pages.
(Continued)

*Primary Examiner* — Michael A Tolin
*Assistant Examiner* — Hana C Page
(74) *Attorney, Agent, or Firm* — Kilpatrick Townsend & Stockton LLP (57) ABSTRACT

A method for forming a composite component, the method comprising: providing a first mould tool and a second mould tool, the first and second mould tools being configured so as to be capable of defining at least part of a mould cavity between them, and the second mould tool having a moulding surface defined by at least two demountable mould bodies; attaching the first mould tool to a press at a first workstation; subsequently, at a second workstation spaced from the first workstation, loading at least part of the second mould tool with reinforcement material whilst the first mould tool
(Continued)

remains attached to the press at the first workstation; moving the second mould tool to the press at the first workstation in such a position as to confront the first mould tool; causing the press to effect relative movement of the first and second tools to bring the first and second tools into mating arrangement so as to define a mould cavity therebetween; and setting in shape the reinforcement material located in the mould cavity.

21 Claims, 4 Drawing Sheets

(51) Int. Cl.
    *B29C 70/48*           (2006.01)
    *B29C 70/54*           (2006.01)
    *B29K 63/00*           (2006.01)
    *B29K 105/08*         (2006.01)

(52) U.S. Cl.
    CPC .... *B29K 2063/00* (2013.01); *B29K 2105/089* (2013.01)

(56) References Cited

U.S. PATENT DOCUMENTS

| | | | |
|---|---|---|---|
| 11,390,001 B2* | 7/2022 | Feigenblum | ............ B29C 33/06 |
| 2002/0098256 A1 | 7/2002 | Polk, Jr. | |
| 2003/0127765 A1 | 7/2003 | Weiland et al. | |
| 2004/0253429 A1 | 12/2004 | Polk, Jr. et al. | |
| 2008/0061466 A1 | 3/2008 | Cornwell et al. | |
| 2008/0241296 A1 | 10/2008 | Wang et al. | |
| 2011/0115117 A1* | 5/2011 | Desmith | ............... B29C 44/428 |
| | | | 425/192 R |
| 2013/0193611 A1 | 8/2013 | Polk, Jr. | |
| 2013/0216757 A1 | 8/2013 | Fox et al. | |
| 2013/0307191 A1 | 11/2013 | Polk, Jr. | |
| 2013/0334727 A1* | 12/2013 | Mine | ................. B29C 45/14827 |
| | | | 425/552 |
| 2015/0258743 A1* | 9/2015 | Lanard | ................. B29C 70/541 |
| | | | 425/500 |
| 2016/0121562 A1 | 5/2016 | Werner et al. | |

FOREIGN PATENT DOCUMENTS

| | | |
|---|---|---|
| DE | 3033494 | 3/1982 |
| EP | 2377674 | 10/2011 |
| EP | 2628588 A2 | 4/2018 |
| JP | 2006327214 | 12/2006 |
| WO | 89/05718 A1 | 6/1989 |

OTHER PUBLICATIONS

Search Report for GB1717411.1 mailed Apr. 23, 2018.
Search Report & Written Opinion for PCT/GB2018/053049 mailed 2019-01-18.

* cited by examiner

MOULDING ARRANGEMENT

This invention relates to moulding components, especially composite components.

An increasing number of relatively large components are being made by moulding. Many of these are composite components, typically fibre-reinforced resin components made of systems such as carbon-fibre/epoxy. Some examples are tubs for automobiles, wings for aircraft, blades for wind turbines and masts for yachts.

Figure 1A:
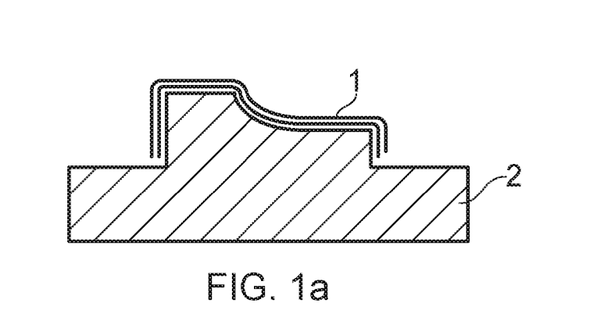
FIG. 1 shows a moulding process.
Figure 1B:
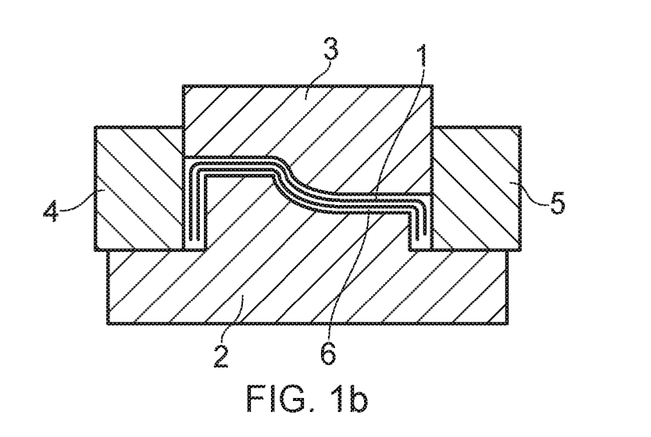
Figure 1C:
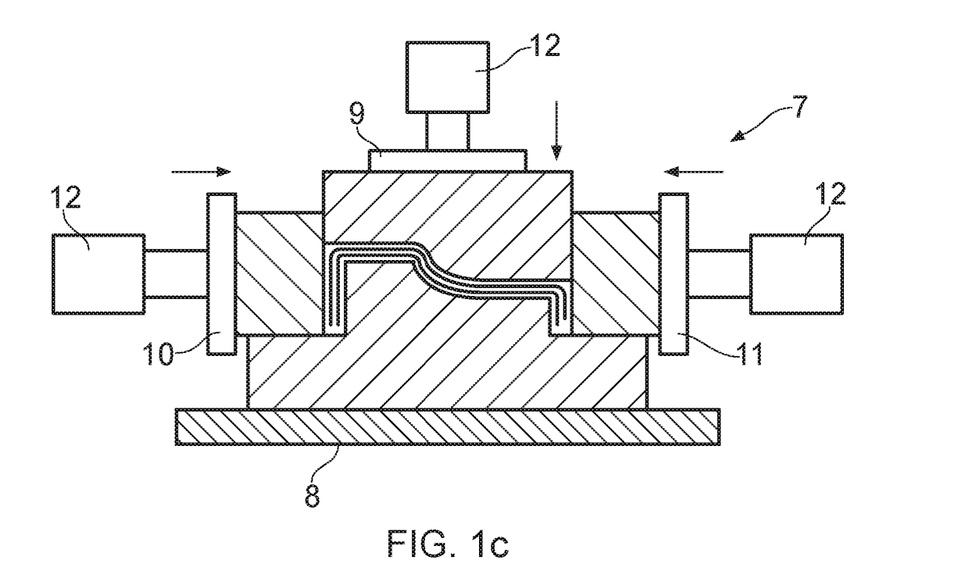

FIG. 1 shows three steps in a system for manufacturing a composite part. In the step shown at 1a, reinforcing fibres 1 are laid up on top of a lower mould part 2. In the step shown at 1b, upper (3) and side (4, 5) mould parts are assembled around the lower mould part to enclose the reinforcing fibres. The mould parts 2 to 5 define a closed mould cavity 6 which holds the reinforcing fibres. Collectively, the mould parts 2 to 5 define a generally cuboid exterior shape. At step 1c the mould parts 2 to 5 are loaded into a press 7. The press has a floor 8 and compression heads 9, 10, 11. The compression heads are mounted on hydraulic rams 12. One ram can force head 9 into opposition with floor 8. The other rams can force heads 10, 11 into opposition with each other. The external shape defined by the assembled mould tools is chosen to be slightly smaller than the space between the compression heads when the rams are fully retracted. This leaves some small play between the fully retracted compression heads and the assembled mould tools when the tools are inserted into the press. Once the assembled mould tools are inserted into the press, the rams are activated to press the mould parts together. Then resin can be injected into the cavity and the mould parts heated to cure the resin. Finally, the rams can be retracted again, the mould parts can be removed from the press and disassembled and the moulded part can be lifted off.

As demand for large composite parts increases, it is becoming desirable to manufacture them in higher volumes and at lower cost. It would be desirable to have a faster and/or more efficient process than the one described above.

According to one aspect there is provided a method for forming a composite component, the method comprising: providing a first mould tool and a second mould tool, the first and second mould tools being configured so as to be capable of defining at least part of a mould cavity between them, and the second mould tool having a moulding surface defined by at least two demountable mould bodies; attaching the first mould tool to a press at a first workstation; subsequently, at a second workstation spaced from the first workstation, loading at least part of the second mould tool with reinforcement material whilst the first mould tool remains attached to the press at the first workstation; moving the second mould tool to the press at the first workstation in such a position as to confront the first mould tool; causing the press to effect relative movement of the first and second tools to bring the first and second tools into mating arrangement so as to define a mould cavity therebetween; and setting in shape the reinforcement material located in the mould cavity.

During the said loading step the demountable mould bodies of the second tool may be demounted from each other. They may be demounted by being brought out of mutual sealing engagement.

During the step of moving the second mould tool the demountable bodies of the second mould tool may be fixed in position relative to each other.

The method may comprise injecting a matrix material into the mould cavity. The step of setting in shape the reinforcement material may comprise solidifying the matrix material, e.g. by curing it.

The method may comprise injecting the matrix material into the mould cavity through the first mould tool.

The method may comprise injecting the matrix material into the mould cavity through multiple nozzles located in the first mould tool.

The press may effect relative movement of the first tool and at least one of the demountable mould bodies to bring them into mating arrangement.

The step of loading the second mould tool with reinforcement material may comprise altering the shape of the reinforcement material relative to at least part of the second mould tool.

The method may comprise the steps, after the said setting step, of: causing the press to effect relative movement of the first and second tools to bring the first and second tools out of mating arrangement; removing the second mould tool from the press whilst the first mould tool remains attached to the press at the first workstation; and removing from the second tool a shaped article formed of the reinforcement material.

The method may comprise the steps, after the said setting step, of: causing the press to effect relative movement of the first and second tools to bring the first and second tools out of mating arrangement; removing the second mould tool from the press whilst the first mould tool remains attached to the press at the first workstation; separating the demountable tool bodies of the second mould tool; and removing from the second tool a shaped article formed of the reinforcement material.

The method may comprise: after the said step of loading at least part of the second mould tool, at the second workstation engaging with that ("first") part of the second mould tool a further part of the second mould tool, the further part of the second mould tool being configured so as to be capable of defining at least part of a mould cavity between itself, the first mould tool and the first part of the second mould tool. The step of moving the second mould tool to the press may comprise moving the first part of the second mould tool and the further part of the second mould tool together to the press.

The method may comprise causing the press to press the further part of the second mould tool into contact with the first part of the second mould tool and the first mould tool before or during the step of injecting a matrix material into the mould cavity.

The method may comprise providing a third mould tool configured so as to be capable of defining at least part of a mould cavity between it and the first mould tool. The method may comprise, at a third workstation spaced from the first and second workstations, loading the third mould tool with reinforcement material whilst the first mould tool remains attached to the press at the first workstation and the second mould tool is located at the first workstation. The method may comprise: whilst the second mould tool is absent from the first workstation: (i) moving the third mould tool to the press at the first workstation in such a position as to confront the first mould tool; (ii) causing the press to effect relative movement of the first and third mould tools to bring the first and third tools into mating arrangement so as to define a mould cavity therebetween; (iii) injecting a matrix material into that mould cavity; and (iv) solidifying the matrix material, e.g. by curing.

The third mould tool may be moved to the press from the third workstation with a horizontal component. The third mould tool may be moved to the press from the third workstation in a substantially horizontal direction.

The method may comprise: providing a third mould tool configured so as to be capable of defining at least part of a mould cavity between it and the first mould tool; at the second workstation, loading the third mould tool with reinforcement material whilst the first mould tool remains attached to the press at the first workstation and the second mould tool is located at a third workstation spaced from the first and second workstations; and whilst the second mould tool is absent from the first workstation: (i) moving the third mould tool to the press at the first workstation in such a position as to confront the first mould tool; (ii) causing the press to effect relative movement of the first and third mould tools to bring the first and third tools into mating arrangement so as to define a mould cavity therebetween; (iii) injecting a matrix material into that mould cavity; and (iv) solidifying the matrix material.

The reinforcement material may be flexible. The reinforcement material may be of a fibre material. The reinforcement material may be a flexible mat, for instance a flexible woven or knitted mat. The reinforcement material may comprise fibres of a high modulus material such as carbon fibre or aramid fibre. The reinforcement material may comprise fibres having a higher tensile yield strength per unit volume than the matrix material.

The step of moving the second mould tool may comprise moving the second mould tool on a path having a horizontal component.

The step of moving the second mould tool may comprise moving the second mould tool on a linear path.

The step of setting in shape the reinforcement material may comprise heating the first mould tool.

The method may comprise heating the first mould tool when no other mould tool is confronting it in the press.

The first and second mould tools may define the mould cavity therebetween in cooperation with one or more further mould tools.

The mould cavity may be a closed mould cavity.

The mould cavity may be defined by moulding surfaces of the first and second mould tools.

The method may comprise: after the said step of loading at least part of the second mould tool with reinforcement material ("the first reinforcement material") at the second workstation, loading at least part of the second mould tool at the second workstations with further reinforcement material in such a way that the further reinforcement material overlaps at least part of the first reinforcement material The method may comprise connecting the first and further reinforcement materials to each other with a joining material in at least part of the overlapping area.

The joining material may be an adhesive.

The relative movement of the first tool and at least one of the demountable mould bodies to bring them into mating arrangement may be movement having a vertical component.

The present invention will now be described by way of example with reference to the accompanying drawings. In the drawings.

FIG. 2 shows steps in the process of manufacturing a composite part. The shape of the part will be defined by the moulding surfaces of a set of mould tools 20, 21, 22, 46 which will together define a mould cavity 50. The lower mould tool 20 and the side mould tools 21, 22 are moveable in and out of an industrial press shown generally at 44. The upper mould tool 46 is fixed as part of the press.

FIGS. 2*a* to 2*e* show a set of steps in the moulding process.

Figure 2A:
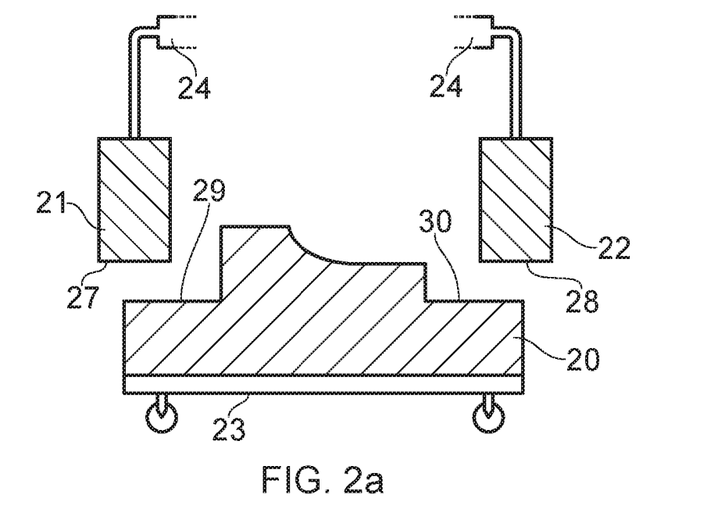
FIG. 2 shows a moulding process.

At step 2*a* the removable mould tools 20, 21, 22 are out of the press and the lower mould tool 20 is ready to be loaded. The lower mould tool sits on a trolley 23 so that it can be moved easily. Alternatively, it could be mounted on a dedicated motion system, as will be discussed further below. The side mould tools 21, 22 have been lifted away from the lower mould tool. Typically, the mould tools will be formed of metal such as steel or aluminium and if the part to be moulded is large they will be of significant weight. The side mould tools can conveniently be lifted on hoists 24 or on robot arms.

Figure 2B:
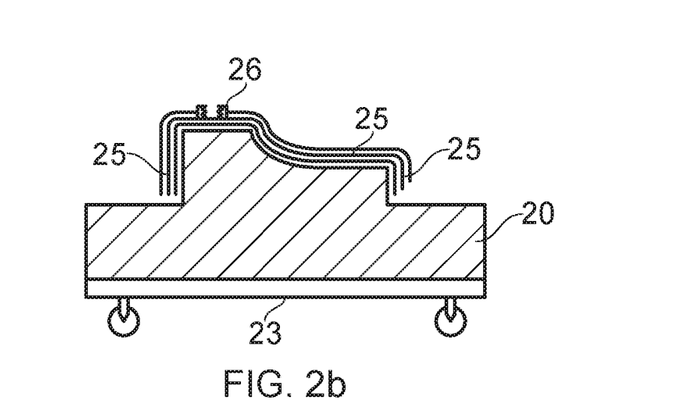

At step 2*b* reinforcing fibres 25 are laid up on the lower mould tool. The fibres may be on the form of knitted or woven sheets, tows, meshes, or any other suitable form. The fibres could be of carbon fibre, glass fibre, high-modulus polymer (for example of an aramid such as Kevlar) or another suitable material. The fibres are flexible. The fibres could be laid up by hand or by machine. In a preferred arrangement, the fibres comprise multiple sheets of fibre material which have previously been cut to shape and are laid up so as to overlap each other in predetermined locations on the lower mould tool. In this way, the resulting part can be given desired strength properties for loadings in specific directions. Conveniently, the fibres can be draped over the lower mould tool, e.g. so that they are in continuous contact with each other or with the lower mould too under the action of gravity. Preferably, the fibres, once laid up, conform to the shape of the mould surface of the lower mould tool. The fibres may be retained in place by means such as tacky adhesive or pins.

Other forms of reinforcement, for example rigid reinforcing elements such as metal ribs or spars, which are intended to be incorporated in the final moulded part could be positioned on the mould tool.

Components that are intended to be embedded in the final moulded part could be positioned on the mould tool. Those could, for example, be intended to serve as hard points for attachment of other components to the final moulded part. They could be internally or externally threaded parts, such as rods, nuts or plates. They could be made of metal. FIG. 2*b* shows an example of an internally threaded hard point component at 26. (For clarity, the hard point is omitted from the drawings of subsequent steps).

The reinforcement and any components to be embedded could be laid up on any one or more of the lower tool 20 and the side tools 21, 22.

Figure 2C:
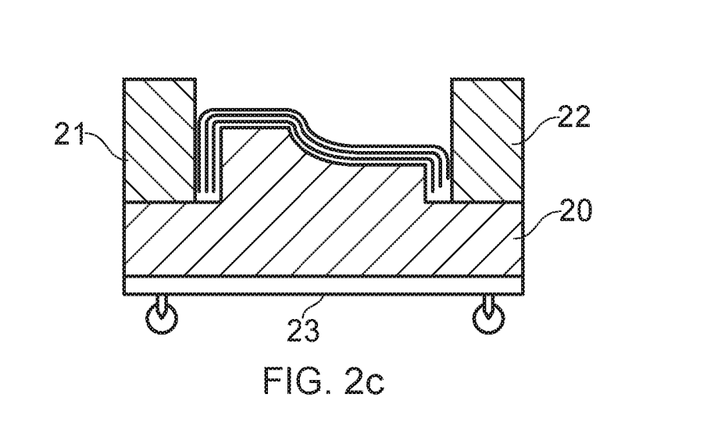

In step 2*c* the side mould tools 21, 22 are married up to the lower mould tool 20. The interfaces between the side mould tools and the lower mould tool are close-fitting so as to seal the mould cavity when all the mould tools have been assembled. The side mould tools can be machined so that their mating surfaces 27, 28 match the contours of the corresponding mating surfaces 29, 30 (see 2*a*) of the lower mould tool against which they sit when the tools are put properly together. The side mould tools may be supported by the lower mould tool once they are assembled together. The side mould tools may then be detached from the hoists 24. The side mould tools may attach to the lower mould tool to prevent them becoming dislodged. This may be achieved by mechanical latching or interlocking, or by another mechanism such as magnetic attraction between the lower mould tool and the side mould tools.

Figure 3:
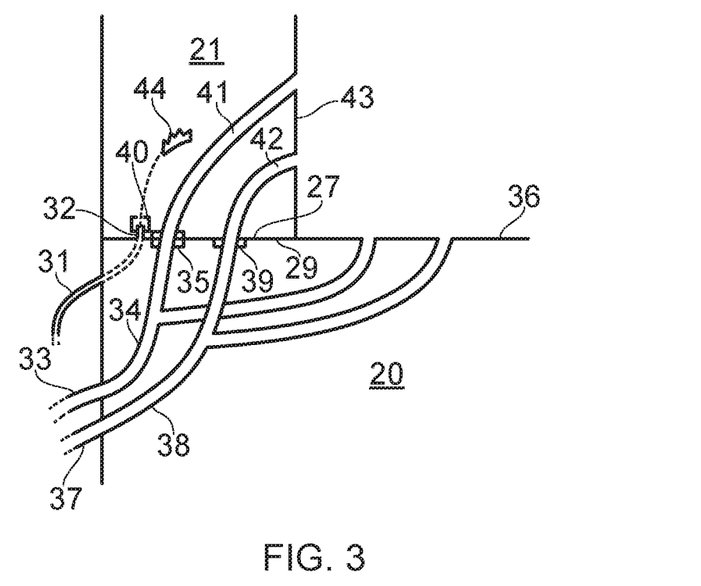
FIG. 3 shows a detail of the interconnections between mould parts.

The lower mould tool and at least one of the side mould tools may be configured so that when they are properly assembled together a conduit within one of the tools mates with a corresponding conduit on the other of the tools. Such a conduit may be a fluid conduit, for example for drawing a vacuum in the mould cavity or for injecting resin into the mould cavity, or an electrical conduit, for example for allowing electrical power from one of the tools to power the operation of a part such as a motor or a heater embedded in the other of the tools. FIG. 3 shows an example of such conduits. FIG. 3 shows a lower mould tool 20 mated to a side mould tool 21. An electrical cable 31 leads to the lower mould tool, passes through the tool and terminates in electrical contacts 32 at the mating surface 29. A vacuum hose 33 leads to the lower mould tool where it couples to a conduit 34 through the tool 20 which terminates in a pneumatic coupler 35 at the mating surface 29. The conduit 34 also communicates with the mould surface 36 of the lower mould tool. A resin supply line 37 leads to the lower mould tool where it couples to a conduit 38 through the tool which terminates in a fluid coupler 39 at the mating surface 29. The conduit 38 also communicates with the mould surface 36 of the lower mould tool. The side mould tool 21 is configured so that when it is properly mated with the lower mould tool an electrical connector 40 carried by the side mould tool mates with electrical contacts 32 and conduits 41, 42 within the side mould tool mate with conduits 34 and 38. The conduits 41, 42 can communicate with the mould surface 43 of the side mould tool 21. When the mould is in use, electricity supplied though the lower mould tool can power a component 44 in the side mould tool, a vacuum can be drawn in the mould cavity through conduit 41 and via conduit 34 in the lower mould tool, and resin can be injected into the mould cavity through conduit 42 and via conduit 38 in the lower mould tool.

Figure 2D:
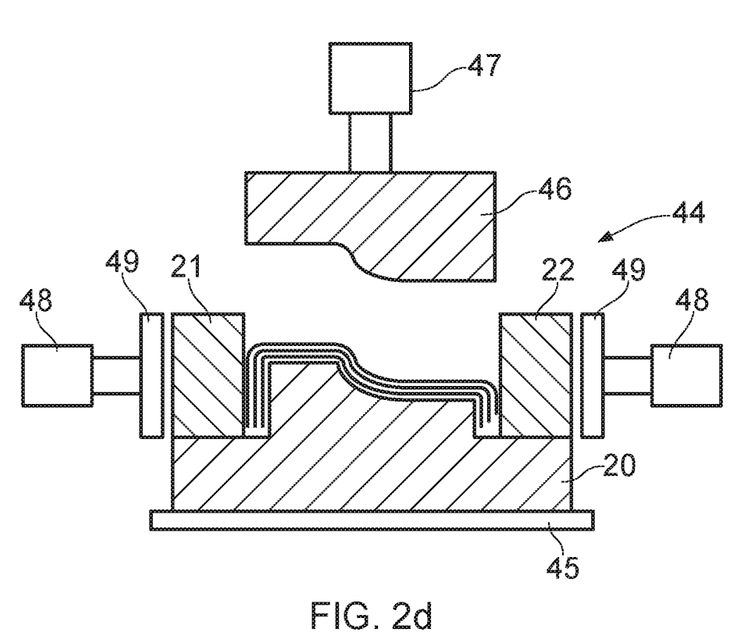

In step 2d the lower and side mould tools are moved so as to be within the press 44. The trolley 23 can assist in bringing the tools to the press, and the tools can then be loaded from the trolley to the bed 45 of the press. There is an upper mould tool 46 which is configured so as to mate with the lower and side mould tools to define the mould cavity. The upper mould tool is fixedly attached to a ram 47 of the press, e.g. by being bolted to the ram. The ram 47 operates vertically. In comparison to a typical conventional moulding press, the vertically-operating ram 47 is a relatively long-stroke ram. For example, it could have a stroke length of greater than 40 cm, greater than 50 cm, greater than 60 cm or greater than 100 cm. This can allow the lower and side mould parts to be slid horizontally into the press without fouling the upper mould part when the upper mould part is retracted vertically by the ram 47; and for the upper mould part to then be brought into its mating arrangement with the other mould parts by being lowered on the ram 47.

The press has other rams 48 for pressing the side mould tools together. Whereas the ram for moving the top tool is attached to the top tool, the rams 48 terminate in pads 49 which are loose from the side mould tools but engage with and press against the side mould tools when the rams are actuated. These rams 48 may have a shorter range of stroke than the vertically operating ram 47. For example, they could have a stroke length of less than 40 cm or less than 20 cm.

The rams could be hydraulic, pneumatic, electrical or mechanically-driven rams.

Figure 2E:
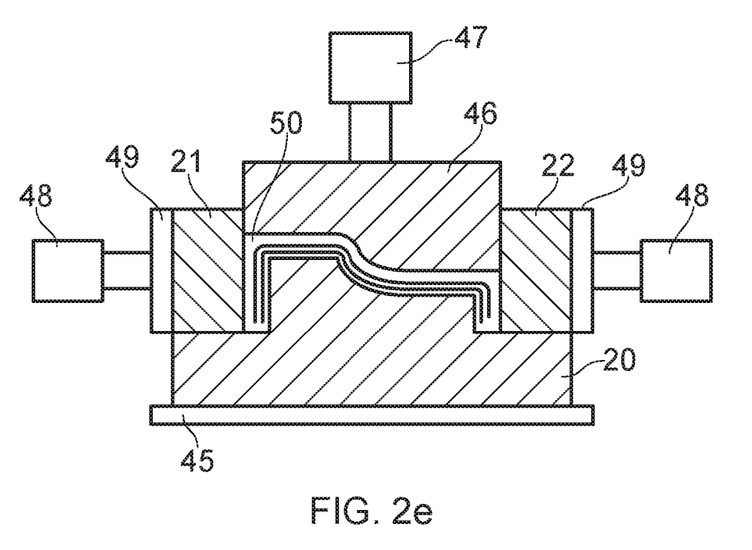

In step 2e the upper mould part 46 is lowered by ram 47 into mating arrangement with the other mould parts. The mating of the upper mould part to the lower and side mould parts defines a closed mould cavity 50 between the mould parts. The other rams 48 are activated to press the side mould parts together. A vacuum may be drawn in the mould cavity. Resin is then injected into the mould cavity. The mould parts are heated to a temperature sufficient to cause the resin to cure.

Once the resin has cured, the upper mould part is retracted, remaining attached to the press. Then the lower and side mould parts are removed from the press, disassembled from each other, and the formed part is de-moulded.

In this process the upper mould part remains attached to the press when the mould is being loaded with the reinforcement that will be integrated into the formed part. The upper mould part remains attached to the press when the mould is being loaded with the other mould parts. The upper mould part remains attached to the press when the other mould parts are being removed from the press. The upper mould part remains attached to the press when the formed part is being de-moulded. The upper mould part remains over the press floor 45 during the entire moulding cycle, including the loading and de-moulding phases.

The ram 47 supports the upper part 46. Ram 47 is conveniently configured so as to move the upper part 46 along a linear path as it mates with the other mould parts. Ram 47 could be a piston and cylinder arrangement.

It has been found that keeping the upper mould part attached to the press makes the moulding process considerably more efficient. It removes the need to position the upper mould part in place outside the press, which takes time as a separate step, and can require heavy lifting machinery such as hoists and robots. Furthermore, a typical press ram is naturally configured to constrain the upper mould part to move in a straight line, and so it can be easier to position the upper mould part precisely in its mated position than it can be using other machinery such as hoists externally to the mould.

The mould parts may be heated using electrical heaters in the mould parts, and/or by circulating heated fluid through the parts. The electrical and/or fluid connections to achieve this are typically located at the press. When mould parts are removed from the press, they are no longer heated and they cool rapidly through exposure to ambient air. This has the advantage of making it easier and safer for manufacturing staff to work around them. In the present system, the upper mould part remains attached to the press throughout the entire moulding cycle. As a result, the upper mould part can remain at an elevated temperature, heated by the press, during the loading and de-moulding phases of the moulding cycle. This can reduce the time needed to get the mould parts up to temperature, and can reduce the energy needed for the moulding process.

The lower tool part stays in the same upward-facing orientation throughout the moulding cycle.

The cables and lines 31, 33, 37 shown in FIG. 3 could be located at the press, and could be coupled to the lower mould to when the lower mould tool is moved to the press. Alternatively, they could be coupled to the upper mould tool, and the upper mould tool could make connection to the side mould tools and via them the lower mould tool in an analogous way to that shown in FIG. 3.

Figure 4:
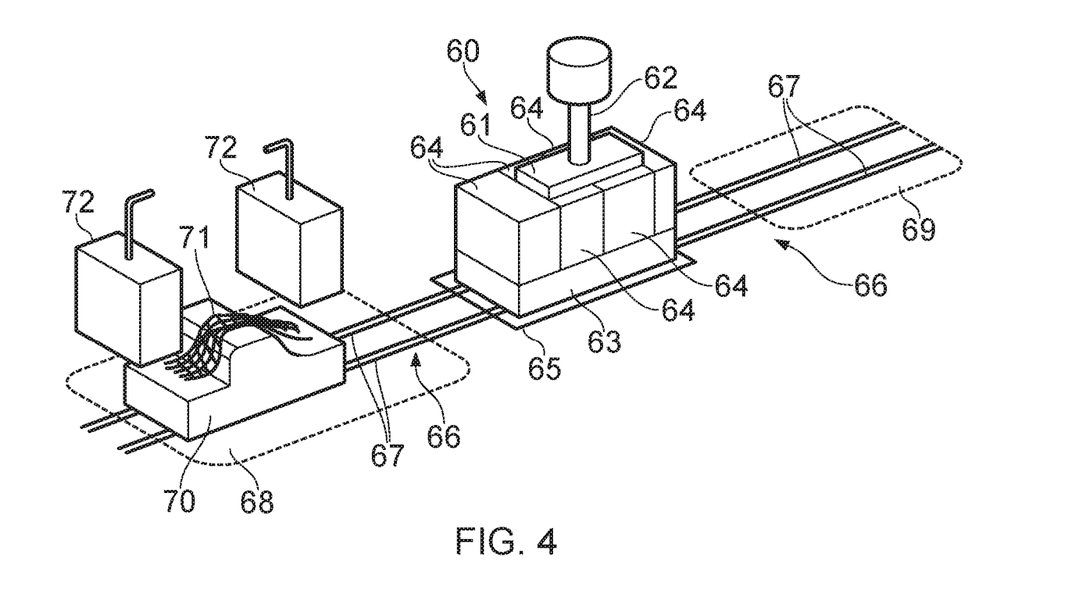
FIG. 4 is a schematic view of an assembly plant.

FIG. 4 shows a production facility for implementing the moulding process described above. In FIG. 4, for clarity some of the rams of the press are omitted. The press is shown at 60. Upper tool 61 is fixedly attached to a vertically acting ram 62 of the press. A lower tool part 63 and various associated side tool parts 64 are inserted in the press in the state as illustrated in FIG. 4. Laterally acting rams (not shown in FIG. 4) are provided for forcing the side tool parts together. The press has a reinforced bed 65 for opposing force applied through the upper tool. A motion system shown generally at 66 extends on either side of the press bed 65. In this example the motion system comprises a set of rails 67, but it could be constituted by any suitable mechanism for facilitating lateral or other suitable motion of the lower tool part into and out of the press. Preferably the motion system is adapted to provide linear motion. The motion system extends through the press bed to workstations 68, 69 on either side of the press bed. Two lower tools are configured to run on the motion system. In the state of the system as shown in FIG. 4, a first lower tool 63 is currently in the press and a second lower tool 70 is currently in workstation 68 to the left of the press. In this position, lower tool 70 could be being loaded with reinforcement 71, or a moulded part could be being removed from it. Side mould tools 72 associated with lower tool 70 are also at workstation 68, having been lifted away from lower tool 70. For clarity some of the side mould tools at station 68 are omitted from FIG. 4. As shown in FIG. 4, lower tool 63 is currently in the press. The rams of the press are operating to force the upper tool 61 towards the lower tool 63 and to force the side tools towards each other. Resin may be being injected into the mould cavity defined in part by lower tool 63, or resin in that cavity may be being cured.

Once resin in the mould cavity of the lower tool that is in the press has been cured, the press is opened and that lower tool is moved along the motion system 66 to a vacant one of the workstations: workstation 69 in the example of FIG. 4. The moulded part can then be de-moulded from that lower tool and that lower tool can be loaded with reinforcement for the next iteration of the process. Meanwhile, the other lower tool, already loaded with reinforcement, can be moved along the motion system from its workstation into the press. The lower tools reciprocate along the motion system, with one tool undergoing injection/curing in the press whilst the other is undergoing loading/de-moulding in one of the workstations 68, 69.

This system has a number of advantages. First, a single upper tool can serve multiple tooling sets. This reduces tooling costs. Second, the delay between successive injection and curing processes is reduced. This increases the rate of production and also results in reduced energy usage because the dwell time between successive curing operations is reduced and so the upper tool can be maintained at temperature more efficiently.

In the examples described in FIG. 2, two side mould tools are shown. There could be any number of side mould tools, or the side moult tools could be omitted and the mould cavity could be defined solely by the upper and lower mould tools.

The process described above could be used for moulding non-reinforced parts, or parts reinforced by small fibres that can be injected with the resin. However, it is particularly advantageous for moulding parts reinforced by elements that are greater than, for example, 1 cm or greater than 10 cm in extent, which may for example be fibre tows, mats or sheets. Such parts can be laid up on the lower mould part outside the mould whilst the upper mould part remains in the mould. When the tool parts are brought together, this action may at least partially consolidate the reinforcement loaded in the tool cavity. Alternatively, the reinforcement can be consolidated using vacuum bagging, diaphragm forming, double diaphragme forming or similar techniques.

The process described above can be used with any suitable moulding process, including resin transfer moulding, vacuum bag moulding, and diaphragm or double-diaphragm moulding. The reinforcement could be coated with resin either when it is laid up (as would be the case when the reinforcement is in the form of a pre-preg) or after it has been laid up but before it is loaded into the press. Alternatively, or in addition, the resin could be injected when the reinforcement has been loaded into the press.

The resin could be any suitable matrix material. Examples include polymers, preferably thermosetting polymers such as epoxies.

The process described above is especially advantageous for the manufacture of complex and/or large-dimension components. The moulded piece could, for example have a dimension greater than 1 m or greater than 2 m. The moulded piece could, for example, be a structural part of a vehicle (e.g. an automobile tub, an aircraft wing or a boat hull) or a part for another purpose such as a blade for a wind turbine.

In the examples given above, the lower tool and the side tools move in and out of the press and the upper tool remains in the press. In alternative embodiments the lower tool and/or one or more of the side tools may remain in the press. The rams would be reconfigured accordingly. However, it is convenient for the lower tool to move out of the press because it is relatively easy to load a tool whose mould surface is facing upwards.

In the examples given above the vertically acting ram 47, 62 is attached to the upper tool. Alternatively the upper tool could be attached to the body of the press and a ram could be configured to lift the press bed carrying the lower tool.

The reinforcement material may comprise fibres having a tensile strength of greater than 300 MPa, more preferably greater than 500 MPa, more preferably greater than 800 MPa.

The press station is preferably equipped with a resin injection system for injecting resin into the cavity of a mould located in the press. The press station is preferably equipped with a supply of energy for heating a mould located in the press.

The mould tools are preferably rigid bodies. Each mould tool comprises at least one mould surface for defining a part of a mould cavity. Each mould surface may be shaped so as to define a part of a predetermined surface profile of a desired article.

In the examples given above, the part to be formed is formed by resin transfer moulding. Reinforcing material is laid up and the mould cavity is closed so as to contain it. Preferably the reinforcing material is distributed throughout the mould cavity. Resin is injected so as to infuse the reinforcing material. Then the resin is cured to harden the reinforcing material in shape. The same movable mould tool system could be used for other forming techniques. For example, the reinforcing material could be pre-impregnated with curable resin, or the reinforcing material could be or comprise a sheet or fibres of a thermoplastic material which is heated to soften it and then cooled to set it in shape in the mould, or of a thermosetting polymer which is heated to set it in shape, or the reinforcement material could be set by the injection of a chemical hardener which reacts with or catalyses the reinforcement material to set it in shape.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming a composite component, the method comprising:
    providing a first mould tool and a second mould tool, the first and second mould tools being configured so as to be capable of defining at least part of a mould cavity between them, and the second mould tool having a moulding surface defined by at least two demountable mould bodies;
    attaching the first mould tool to a press at a first workstation;
    subsequently, at a second workstation spaced from the first workstation, loading at least part of the second mould tool with first reinforcement material whilst the first mould tool remains attached to the press at the first workstation, wherein during the said loading step the demountable mould bodies of the second tool are demounted from each other by being brought out of mutual sealing engagement;
    moving the second mould tool to the press at the first workstation in such a position as to confront the first mould tool, wherein the demountable bodies of the second mould tool are fixed in relative position to be in mutual sealing engagement during the moving of the second mould tool;
    causing the press to effect relative movement of the first and second tools to bring the first and second tools into mating arrangement so as to define a mould cavity therebetween, the mould cavity having a surface that is defined at least in part by the moulding surface;
    setting in shape the reinforcement material located in the mould cavity; and
    after the said step of loading at least part of the second mould tool with the first reinforcement material at the second workstation, loading at least part of the second mould tool at the second workstation with further reinforcement material in such a way that the further reinforcement material overlaps at least part of the first reinforcement material.

2. A method as claimed in claim 1, wherein the method comprises injecting a matrix material into the mould cavity and the step of setting in shape the reinforcement material comprises solidifying the matrix material.

3. A method as claimed in claim 2, comprising injecting the matrix material into the mould cavity through the first mould tool.

4. A method as claimed in claim 1, wherein the press effects relative movement of the first tool and at least one of the demountable mould bodies to bring them into mating arrangement.

5. A method as claimed in claim 1, wherein the step of loading the second mould tool with reinforcement material comprises altering the shape of the reinforcement material relative to at least part of the second mould tool.

6. A method as claimed in claim 1, comprising the steps, after the said setting step, of:
    causing the press to effect relative movement of the first and second tools to bring the first and second tools out of mating arrangement;
    removing the second mould tool from the press whilst the first mould tool remains attached to the press at the first workstation; and
    removing from the second tool a shaped article formed of the reinforcement material.

7. A method as claimed in claim 1, comprising the steps, after the said setting step, of:
    causing the press to effect relative movement of the first and second tools to bring the first and second tools out of mating arrangement;
    removing the second mould tool from the press whilst the first mould tool remains attached to the press at the first workstation;
    separating the demountable tool bodies of the second mould tool; and
    removing from the second tool a shaped article formed of the reinforcement material.

8. A method as claimed in claim 1, comprising:
    after the said step of loading at least part of the second mould tool, at the second workstation engaging with that part of the second mould tool, that part of the second mould tool being a first part of the second mould tool, a further part of the second mould tool, the further part of the second mould tool being configured so as to be capable of defining at least part of a mould cavity between itself, the first mould tool and the first part of the second mould tool;
    and wherein the step of moving the second mould tool to the press comprises moving the first part of the second mould tool and the further part of the second mould tool together to the press.

9. A method as claimed in claim 1, wherein the step of moving the second mould tool comprises moving the second mould tool on a path having a horizontal component.

10. A method as claimed in claim 1, wherein the step of setting in shape the reinforcement material comprises heating the first mould tool.

11. A method as claimed in claim 1, comprising heating the first mould tool when no other mould tool is confronting it in the press.

12. A method as claimed in claim 1, wherein when the first and second mould tools define the mould cavity therebetween, they do so in cooperation with one or more further mould tools.

13. A method as claimed in claim 1, wherein the mould cavity is a closed mould cavity.

14. A method as claimed in claim 1, wherein the mould cavity is defined by moulding surfaces of the first and second mould tools.

15. A method as claimed in claim 1, comprising connecting the first and further reinforcement materials to each other with a joining material in at least part of the overlapping area.

16. A method for forming a composite component, the method comprising:
    providing a first mould tool and a second mould tool, the first and second mould tools being configured so as to be capable of defining at least part of a mould cavity between them, and the second mould tool having a moulding surface defined by at least two demountable mould bodies;

attaching the first mould tool to a press at a first workstation;

subsequently, at a second workstation spaced from the first workstation, loading at least part of the second mould tool with reinforcement material whilst the first mould tool remains attached to the press at the first workstation, wherein during the said loading step the demountable mould bodies of the second tool are demounted from each other by being brought out of mutual sealing engagement;

moving the second mould tool to the press at the first workstation in such a position as to confront the first mould tool, wherein the demountable bodies of the second mould tool are fixed in relative position to be in mutual sealing engagement during the moving of the second mould tool;

causing the press to effect relative movement of the first and second tools to bring the first and second tools into mating arrangement so as to define a mould cavity therebetween;

setting in shape the reinforcement material located in the mould cavity;

providing a third mould tool configured so as to be capable of defining at least part of a mould cavity between it and the first mould tool;

at a third workstation spaced from the first and second workstations, loading the third mould tool with reinforcement material whilst the first mould tool remains attached to the press at the first workstation and the second mould tool is located at the first workstation; and whilst the second mould tool is absent from the first workstation:
  (i) moving the third mould tool to the press at the first workstation in such a position as to confront the first mould tool;
  (ii) causing the press to effect relative movement of the first and third mould tools to bring the first and third tools into mating arrangement so as to define a mould cavity therebetween;
  (iii) injecting a matrix material into that mould cavity; and
  (iv) solidifying the matrix material.

17. A method as claimed in claim 16, wherein the method comprises injecting a matrix material into the mould cavity and the step of setting in shape the reinforcement material comprises solidifying the matrix material.

18. A method as claimed in claim 17, comprising injecting the matrix material into the mould cavity through the first mould tool.

19. A method for forming a composite component, the method comprising:
providing a first mould tool and a second mould tool, the first and second mould tools being configured so as to be capable of defining at least part of a mould cavity between them, and the second mould tool having a moulding surface defined by at least two demountable mould bodies;
attaching the first mould tool to a press at a first workstation;
subsequently, at a second workstation spaced from the first workstation, whilst the demountable mould bodies of the second tool are demounted from each other by being brought out of mutual sealing engagement, loading one of the demountable mould bodies of the second mould tool with reinforcement material whilst the first mould tool remains attached to the press at the first workstation;

after the said step of loading at least part of the second mould tool with reinforcement material, assembling the at least two demountable mould bodies to bring the demountable mould bodies into mutual sealing engagement;

moving the second mould tool to the press at the first workstation in such a position as to confront the first mould tool, wherein the demountable bodies of the second mould tool are fixed in relative position to be in mutual sealing engagement during the moving of the second mould tool;

causing the press to effect relative movement of the first and second tools to bring the first and second tools into mating arrangement so as to define a mould cavity therebetween, the mould cavity having a surface that is defined at least in part by the moulding surface; and setting in shape the reinforcement material located in the mould cavity;

providing a third mould tool configured so as to be capable of defining at least part of a mould cavity between it and the first mould tool;

at the second workstation, loading the third mould tool with reinforcement material whilst the first mould tool remains attached to the press at the first workstation and the second mould tool is located at a third workstation spaced from the first and second workstations; and whilst the second mould tool is absent from the first workstation:
  (i) moving the third mould tool to the press at the first workstation in such a position as to confront the first mould tool;
  (ii) causing the press to effect relative movement of the first and third mould tools to bring the first and third tools into mating arrangement so as to define a mould cavity therebetween;
  (iii) injecting a matrix material into that mould cavity; and
  (iv) solidifying the matrix material.

20. A method as claimed in claim 19, wherein the method comprises injecting a matrix material into the mould cavity and the step of setting in shape the reinforcement material comprises solidifying the matrix material.

21. A method as claimed in claim 20, comprising injecting the matrix material into the mould cavity through the first mould tool.

* * * * *